United States Patent
Liu et al.

(10) Patent No.: US 8,699,445 B2
(45) Date of Patent: Apr. 15, 2014

(54) WIRELESS COMMUNICATION SYSTEM

(75) Inventors: Chunmei Liu, Great Falls, VA (US);
Masoud Olfat, Great Falls, VA (US);
Feng Huang, Herndon, VA (US);
Mohammad Hassan Partovi, Potomac, MD (US); David S. McGinniss, Aurora, IL (US)

(73) Assignee: Clearwire IP Holdings LLC, Bellevue, WA (US)

( * ) Notice: Subject to any disclaimer, the term of this patent is extended or adjusted under 35 U.S.C. 154(b) by 554 days.

(21) Appl. No.: 12/533,889

(22) Filed: Jul. 31, 2009

(65) Prior Publication Data

US 2011/0026455 A1 Feb. 3, 2011

(51) Int. Cl.
*H04W 4/00* (2009.01)
(52) U.S. Cl.
USPC ............................................. 370/330
(58) Field of Classification Search
None
See application file for complete search history.

(56) References Cited

U.S. PATENT DOCUMENTS

| | | | |
|---|---|---|---|
| 2005/0101326 A1* | 5/2005 | Kang et al. | 455/436 |
| 2005/0250499 A1* | 11/2005 | Lee et al. | 455/437 |
| 2006/0099972 A1 | 5/2006 | Nair et al. | |
| 2006/0234742 A1* | 10/2006 | Kim et al. | 455/513 |
| 2007/0078999 A1 | 4/2007 | Corson et al. | |
| 2007/0083669 A1 | 4/2007 | Tsirtsis et al. | |
| 2007/0270147 A1* | 11/2007 | Choi et al. | 455/436 |
| 2007/0298761 A1 | 12/2007 | Bani Hani | |
| 2009/0131056 A1* | 5/2009 | Bontu et al. | 455/436 |
| 2009/0209254 A1* | 8/2009 | Oguchi | 455/434 |
| 2010/0144349 A1* | 6/2010 | Kang et al. | 455/435.1 |

FOREIGN PATENT DOCUMENTS

WO    WO2008050424    *   5/2008

OTHER PUBLICATIONS

Author Unknown, IEEE 802.16e Standard, draft 7, Apr. 7, 2005, pp. 1-5, 81-170 and 516-518.*
V. Yanover, B. Kim, I. Shahar, Y. Eliaspur, H. Lim, Network Re-Entry Optimization, May 4, 2005, pp. 1-5.*
H. Kang, J. Son, C. Koo, Resource Remain type for Drop or Ping Pong Call Recovery, Samsung Electronics Contribution to IEEE 802.16e, Document No. IEEEC802.16e-04/55, pp. 1-5, May 7, 2004.*

* cited by examiner

*Primary Examiner* — John Blanton
*Assistant Examiner* — Christopher Crutchfield

(57) ABSTRACT

A method of operating a communication system comprises exchanging initial communications between a wireless communication device and a communication network over a wireless connection between the wireless communication device and a network access system and a network connection between the wireless communication device and the communication network. The method further comprises performing a plurality of ranging processes to monitor a status of the wireless connection. Upon successfully completing a ranging process of the plurality of ranging processes, the method comprises determining a duration elapsed since the last successful ranging process and processing the duration to determine if the duration satisfies a criteria. The method further comprises, if the duration does not satisfy the criteria, then setting the indicator to indicate that a partial entry process is required to regain the network connection, and in response to the deterioration of the wireless link, processing the indicator to determine if the partial network entry process is required to regain the network connection.

17 Claims, 10 Drawing Sheets

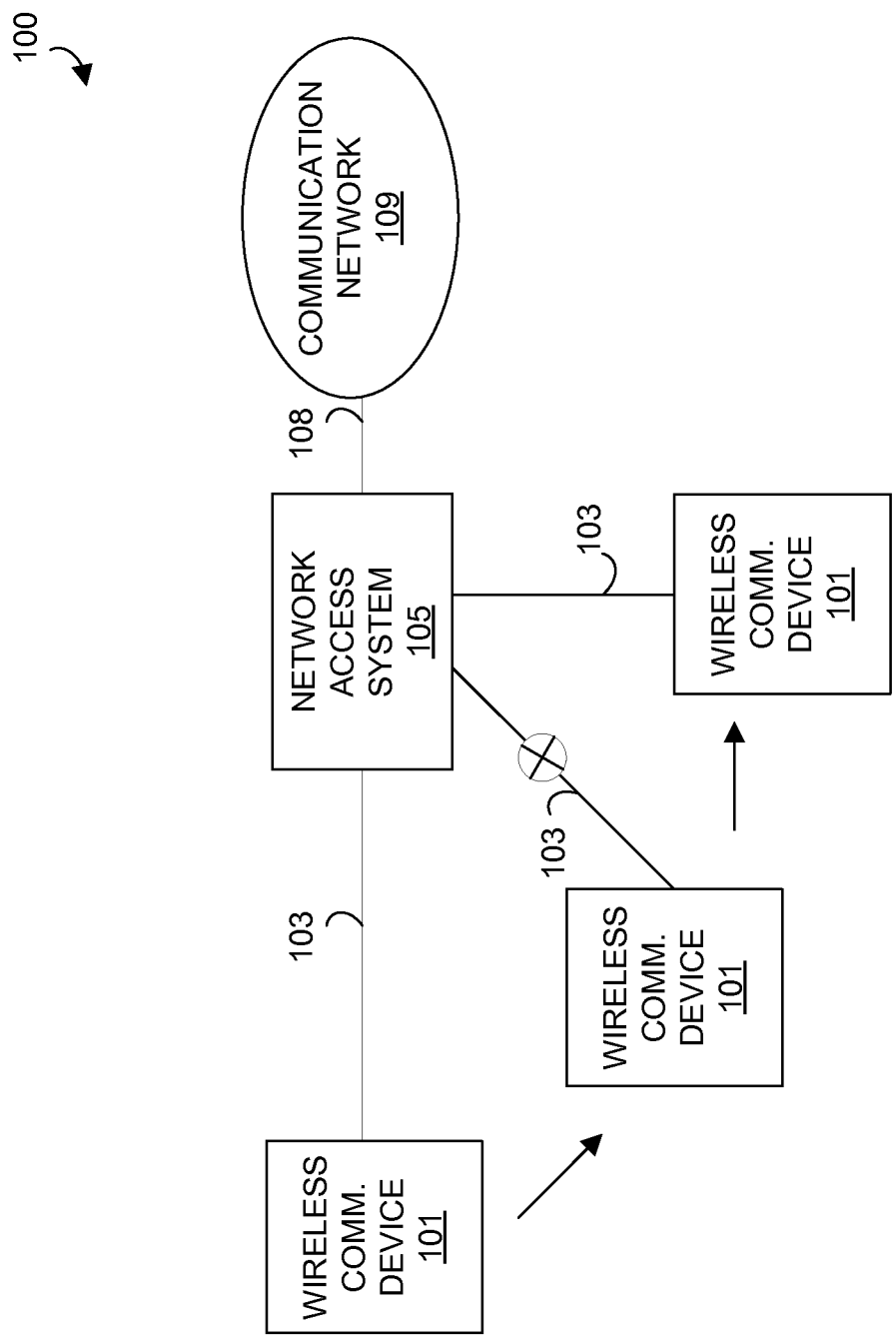

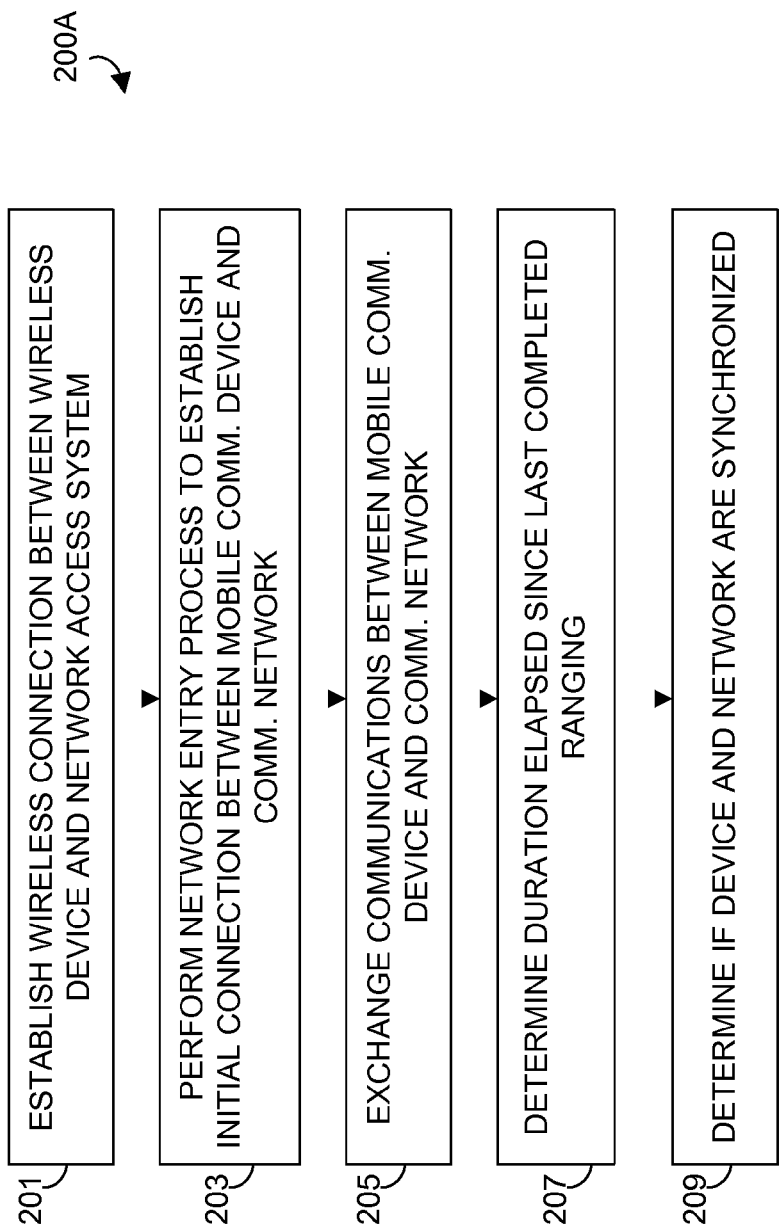

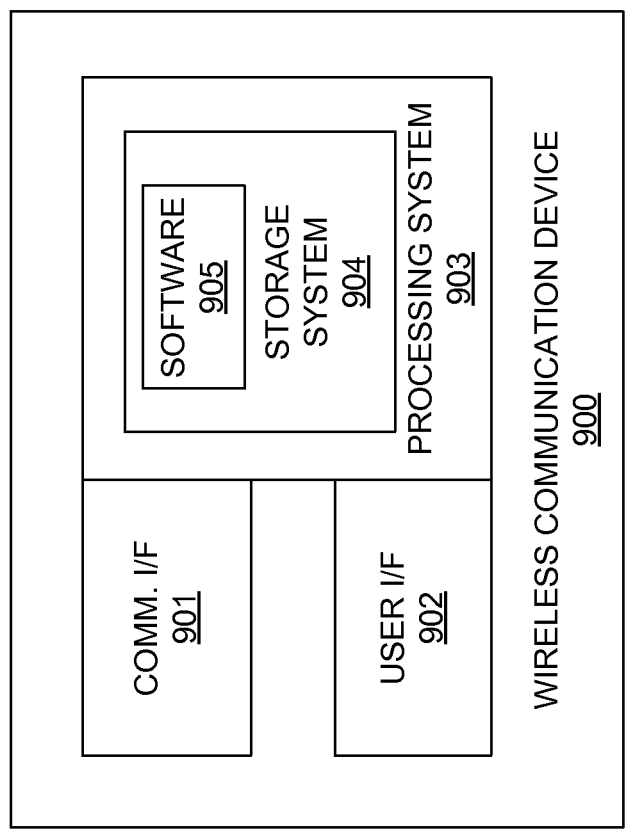

WIRELESS COMMUNICATION SYSTEM

TECHNICAL BACKGROUND

Wireless communication devices commonly communicate at various layers with wireless communication networks. Links established at low layers allow communications to commence at upper layers. The failure of a lower layer link may cause the failure of upper layer links. Upon regaining a lower layer link, a wireless device may be required to perform various processes to regain upper layer links.

In many cases, wireless links may degrade due to various factors or conditions. For example, a wireless device may encounter a coverage hole. Such a degradation of a wireless link may cause upper layer links, such as a network connection, to fail. Upon regaining the wireless link, the wireless device must also regain the network connection. The steps or processes involved in regaining the network connection may cause delay or latency, thereby affecting a user experiences, device performance, or the like.

One important aspect that affects user experiences and device performance is synchronization. Synchronization between a device and a network reduces delay and latency and improves user experiences. In contrast, when a device is not synchronized with a network, fundamental operations can be inhibited.

OVERVIEW

A method of operating a communication system comprises exchanging initial communications between a wireless communication device and a communication network over a wireless connection between the wireless communication device and a network access system and a network connection between the wireless communication device and the communication network. The method further comprises performing a plurality of ranging processes to monitor a status of the wireless connection. A duration elapsed since a last successful ranging process is determined and processed to determine if the duration satisfies a criteria. The method further comprises, if the duration does not satisfy the criteria, then setting the indicator to indicate that a partial entry process is required to regain the network connection, and in response to the deterioration of the wireless link, processing the indicator to determine if the partial network entry process is required to regain the network connection.

BRIEF DESCRIPTION OF THE DRAWINGS

FIG. 1 illustrates a wireless communication system.

FIG. 2A illustrates the operation of the wireless communication system.

FIG. 9 illustrates a wireless communication device.

DETAILED DESCRIPTION

Figure 2B:
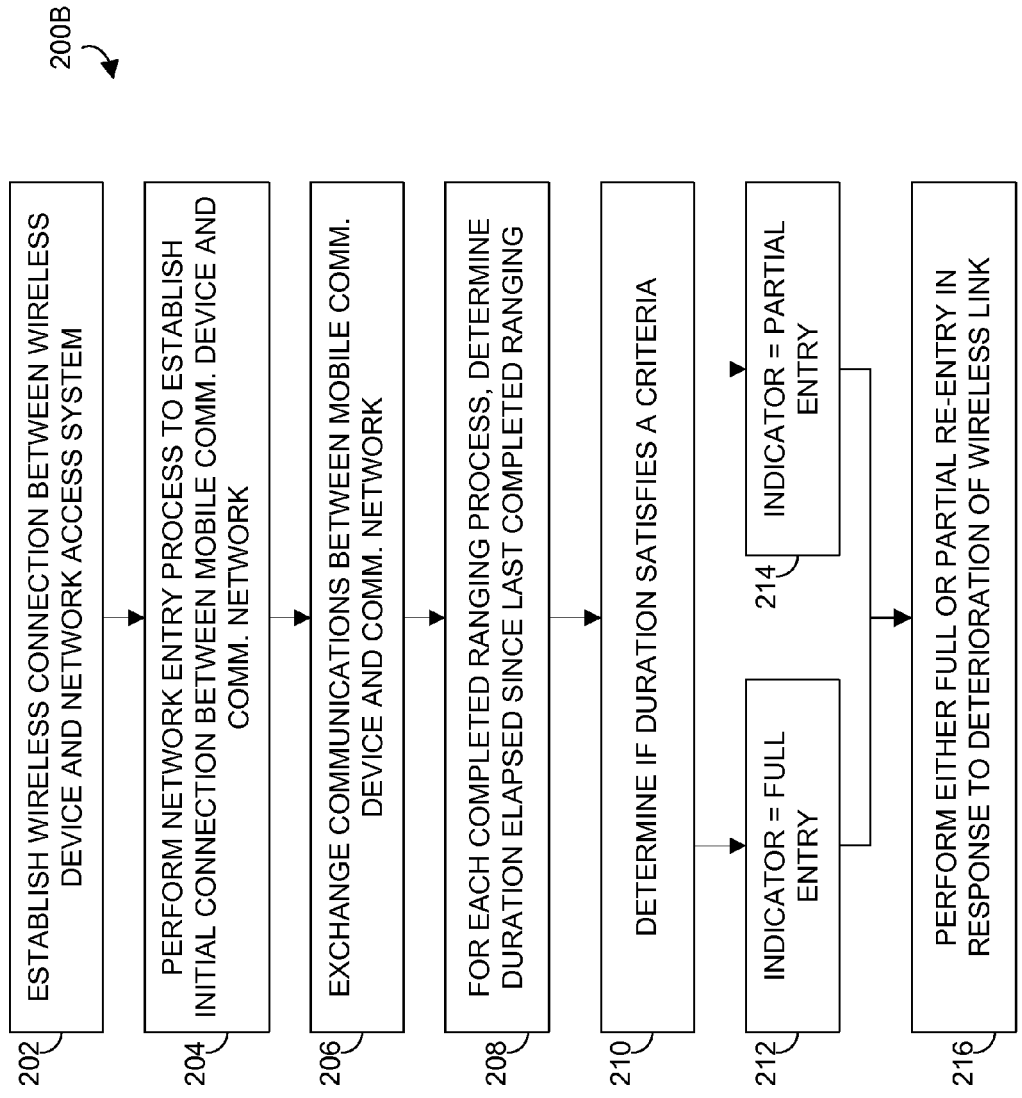
FIG. 2B illustrates the operation of the wireless communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication system 100. Communication system 100 includes wireless communication device (wireless device) 101, network access system 105, and communication network 109. Wireless device 101 and network access system 105 communicate over wireless link 103. Network access system 105 and communication network 109 communicate over communication link 108.

FIG. 2A illustrates process 200A describing the operation of communication system 100. To begin, a wireless link is established between wireless device 101 and network access system 105 (Step 201) and a network entry process is performed to establish an initial connection between wireless device 101 and communication network 109 (Step 203). Communications are exchanged over the wireless link and the network connection between wireless device 101 and communication network 109 (Step 205).

During operation, wireless device 101 may perform a ranging process to monitor wireless link 103. A successful ranging process means that wireless link 103 is operable and communications can be exchanged over it. An unsuccessful ranging process may indicate that wireless link 103 may have deteriorated. For example, the wireless link may be dropped, degraded, or otherwise deteriorated to a level insufficient for exchanging communications between wireless device 101 and network access system 105.

Each successful ranging process may have been preceded by at least one unsuccessful ranging process. In other words, wireless device 101 may have entered into a coverage hole, during which at least one ranging process was attempted but not completed. Upon exiting the coverage hole, wireless device 101 will eventually complete a successful ranging process.

Wireless device 101 determines the duration elapsed since the last successful ranging process (Step 207). Next, wireless device 101 determines if it is synchronized with the network based on the duration elapsed since the last successful ranging process (Step 209).

In this manner, wireless device 101 can ascertain whether or not it is synchronized with the network. Based on this information, wireless device 101 can take various steps to ensure that it regains synchronization with the network. In addition, wireless device 101 can determine which network entry steps to perform to regain access to the network. It should be understood that other elements could perform as described herein for wireless device 101. For example, network access system 105 could determine if it is synchronized with wireless device 101.

FIG. 2B illustrates another process 200B describing the operation of communication system 100. To begin, a wireless link is established between wireless device 101 and network access system 105 (Step 202) and a network entry process is performed to establish an initial connection between wireless device 101 and communication network 109 (Step 204). Communications are exchanged over the wireless link and the network connection between wireless device 101 and communication network 109 (Step 206).

During operation, wireless device 101 may perform a ranging process to monitor wireless link 103. A successful ranging process means that wireless link 103 is operable and communications can be exchanged over it. An unsuccessful ranging process may indicate that wireless link 103 may have deteriorated. For example, the wireless link may be dropped, degraded, or otherwise deteriorated to a level insufficient for exchanging communications between wireless device 101 and network access system 105.

Each successful ranging process may have been preceded by at least one unsuccessful ranging process. In other words, wireless device 101 may have entered into a coverage hole, during which at least one ranging process was attempted but not completed. Upon exiting the coverage hole, wireless device 101 will eventually complete a successful ranging process.

Upon the completion of each successful ranging process, wireless device 101 determines the duration elapsed since the last successful ranging process (Step 208). Next, wireless device 101 determines if the duration satisfies a criteria (Step 210). For example, the criteria may comprise comparing the duration to a threshold amount of time to determine if the duration meets, exceeds, or is less than the threshold amount of time.

If the duration satisfies the criteria, an indicator stored in wireless device 101 is set to indicate that a full entry is required to re-enter the network upon exiting the coverage hole (Step 212). For example, the full entry may comprise all of the steps of the network entry process performed by wireless device 101 to initially enter the network. If the duration does not satisfy the criteria, the indicator stored in the wireless device is set to indicate that a partial entry is required to re-enter the network upon exiting the coverage hole (Step 214). For example, the partial entry may comprise less than all of the steps of the network entry process performed by wireless device 101 to initially enter the network. A full network re-entry process may require more steps to be performed than a partial network re-entry process. It would thus be beneficial to perform a partial network re-entry process, if possible.

Upon an improvement of the wireless link between wireless device 101 and network access system 105, either the full or partial network re-entry process is performed to regain the network connection (Step 216). After re-establishing the network connection, wireless device 101 commences with an exchange of communications with communication network 109.

Referring back to FIG. 1, wireless device 101 is any device capable of communicating wirelessly with network access system 105. Wireless device 101 comprises communication interface and processing elements configured to operate as described herein for wireless device 101. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. Wireless device 101 may also include a user interface, memory device, software, processing circuitry, or some other communication components. Wireless communication device 101 may be a phone, computer, e-book, mobile Internet appliance, wireless network interface card, media player, game console, or some other wireless communication apparatus—including variations or combinations thereof.

Network access system 105 comprises RF communication circuitry and an antenna. The RF communication circuitry typically includes an amplifier, filter, RF modulator, and signal processing circuitry. Network access system 105 may also comprise a router, server, memory device, software, processing circuitry, cabling, power supply, network communication interface, structural support, or some other communication apparatus. Network access system 105 could be a base station, Internet access node, telephony service node, wireless data access point, or some other wireless communication system—including variations or combinations thereof.

Communication network 109 comprises any network or collection of networks capable of communicating with network access system 105 over communication link 108. Examples of communication network 109 include a Wide Area Network (WAN), Local Area Network (LAN), internet, intranet, public switch telephone network (PSTN), wireless communication network, cable multi-service operator (MSO) network, or any combination or variation thereof.

Wireless link 103 uses the air or space as the transport media. Wireless link 103 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Communication link 108 uses metal, glass, air, space, or some other material as the transport media. Communication link 108 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 108 could be a direct link or may include intermediate networks, systems, or devices.

In operation, a user operates wireless communication device 101 to establish communication sessions between wireless device 101 and communication network 109. For example, a user may operate wireless device 101 to place a phone call, check an email account, browse the Internet, or otherwise communicate with a destination via communication network 109.

In order to exchange communications in this manner, wireless communication device 101 first establishes wireless link 103 with network access system 105. Upon establishing wireless link 103, wireless device 101 performs a network entry process to establish an initial network connection with communication network 109. The network entry process may comprise several steps, at the completion of which wireless device 101 is able to exchange communications with communication network 109.

At times, the quality of wireless link 103 may vary. For example, the signal strength of wireless link 103 as measured by wireless device 101 may increase or decrease due to a variety of factors. In fact, the quality of wireless link 103 may suffer so greatly that wireless link 103 is dropped, thereby inhibiting wireless device 101 from exchanging session communications over the network connection with communication network 109.

Referring to FIG. 1, an example is depicted of one such an occurrence whereby wireless link 103 degrades and is dropped. In this illustration, wireless device 101 has initially established wireless link 103 with network access system 105, but then moves to a new location. At the new location, a coverage hole is encountered and wireless link 103 degrades as a result. The coverage hole could be created by a variety of factors, such as buildings, RF interference, or the like. It should be understood that a coverage hole could occur regardless of the movement of wireless device 101.

At some point after encountering the coverage hole, wireless device 101 may move beyond the area experiencing the coverage hole. At this time, wireless device 101 may be able to re-establish wireless link 103. Assuming wireless link 103 is re-established, it may be necessary to re-establish the network connection between wireless device 101 and communication network 109.

At the same time, wireless device 101 continually performs ranging processes to gauge wireless link 103. When in a coverage area, the ranging process completes successfully and wireless device 101 is able to communicate with network access system 105. When in a coverage hole, the ranging process does not complete successfully and wireless device 101 is not able to communicate with network access system 105.

Upon exiting the coverage hole, a ranging process is eventually completed successfully. At that time, either a full or partial network entry process may be performed by wireless device 101, depending upon the duration between the successfully completed ranging process and the previously completed ranging process. In other words, a full or partial network entry process is required based on how long wireless device 101 remained in the coverage hole.

More particularly, after each successfully completed ranging process, wireless device 101 checks the amount of time elapsed since the last completed ranging process. If the elapsed time exceeds a threshold, an indicator stored in wireless device 101 is set to indicate that a full entry process is required to re-enter the network, should a coverage hole be encountered. Likewise, if the elapsed time is less than a threshold, then the stored indicator is set to indicate that a partial entry process can be performed to re-enter the network.

After re-establishing wireless link 103, wireless device 101 checks the indicator to determine if the full or partial network entry process is required to re-enter the process. This determination is made by wireless device 101 and either the partial or full re-entry process is performed accordingly. After re-establishing the network connection, wireless device 101 commences with an exchange of communications with communication network 109.

As in other communication systems, state synchronization among different entities in WiMAX systems is important for proper system operations, including state synchronization between a WiMAX device (MS) and a WiMAX network.

State synchronization means that state information, including the MS operation mode (e.g. active mode or idle mode) as well as context associated with the MS, is retained at both ends. Retaining this context information is important because a WiMAX network's operating behavior towards a WiMAX device (and vice versa) would be different depending on the knowledge of the overall connection state between them, such as radio link state, whether the device is in idle mode or sleep mode or active mode, and so on. For example, when the MS is in idle mode and there is incoming data for the MS, the network will page the MS. In contrast, when the MS is in active mode, the network will simply send packets to the MS. Hence, it is essential for the device and the network to maintain and synchronize state information, so that the device and the network can at all times be aware of each other's state.

Improved synchronization between the MS and the network will avoid many problems. For example, due to lack of synchronization, when an MS re-enters a network after a temporary lose of connection, the MS does not know that the network still has its context and hence performs full network entry, which causes significant delay. Meanwhile, the network does not know that MS is re-entering the network and hence rejects its IP address request, and the possible new IP address assigned to the MS could have a potentially significant application layer impact.

Disclosed herein is a mechanism that allows both a WiMAX device and the network to maintain and synchronize state information, so that the device and the network can at all times be aware of each other's states. This will improve network operations and performance.

Figure 3:
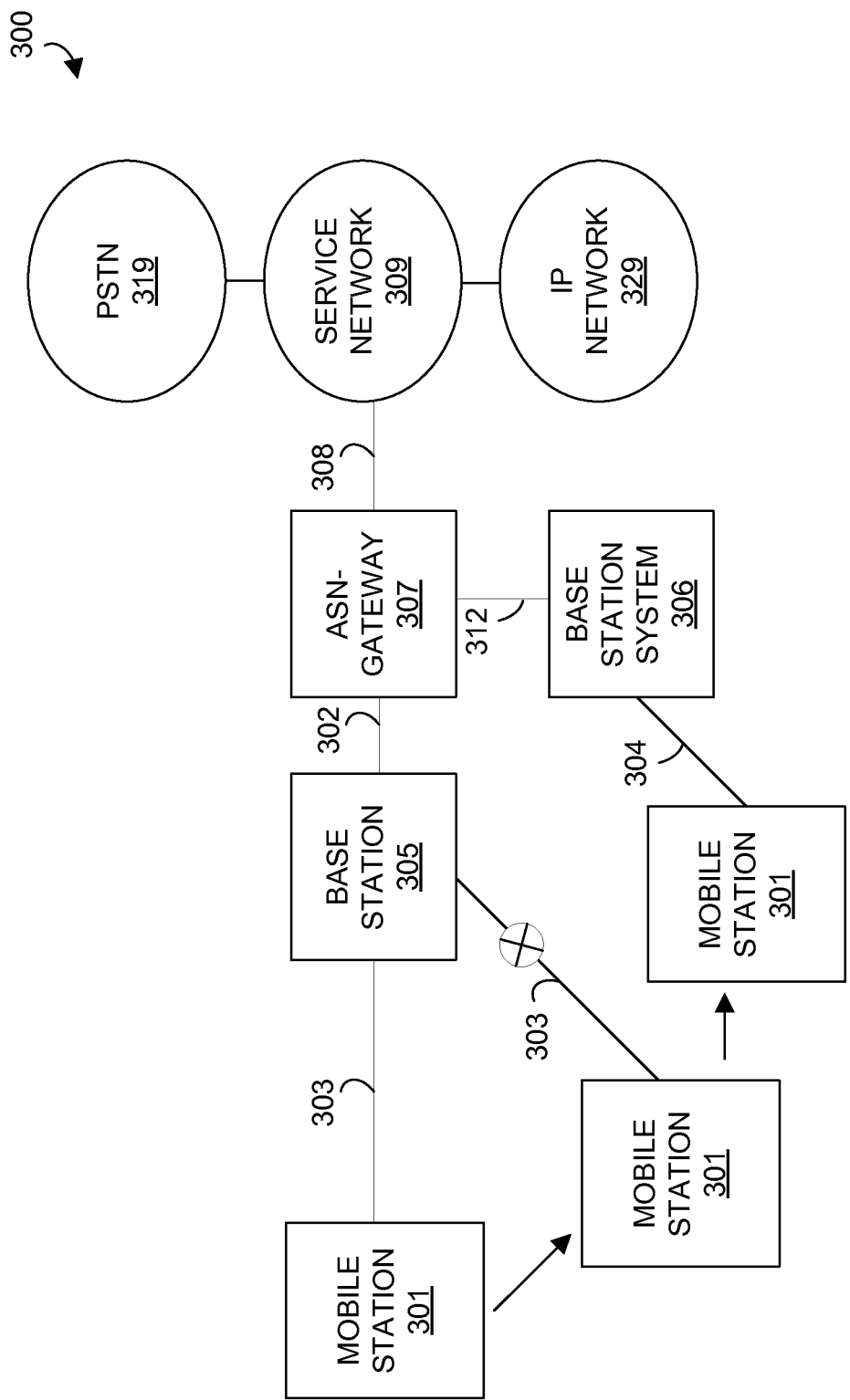
FIG. 3 illustrates a wireless communication system.

FIG. 3 illustrates a network architecture suitable for the WiMax wireless interface protocol. However, it should be understood that other wireless protocols could be use, as well as other network architectures. Examples of other suitable wireless protocols include WCDMA, CDMA2000, CDMA, EVDO, GSM, LTE, WIFI, and HSPA, as well as other variations and combinations thereof.

Continuing with FIG. 3, communication system 300 is illustrated and includes wireless communication device (wireless device) 301, base station 305, base station 306, access service network (ASN) gateway 307, service network 309, public switched telephone network 319, and Internet Protocol (IP) network 329.

Mobile station 301 and base station 305 communicate over wireless link 303. Base station 305 and access gateway 307 communicate over link 302. Base station system 306 and access gateway system 307 communication over link 312. Access gateway system 307 and communication network 309 communicate over communication link 308.

Mobile station 301 comprises any device capable of communicating with service network 309—and thus, with PSTN 319 and IP network 329—over a wireless interface with base station systems 305 and 306 over an air interface. Mobile phones, portably computers, mobile media devices, and network interface cards are examples of such devices. Mobile station 301 may sometimes be referred to as a mobile station (MS).

Base stations 305 and 306 provide the wireless interface to mobile station 301, over which mobile station 301 exchanges communications with service network 309. Base stations 305 and 306 provide functions such as mobility management, hand off provisioning and control, radio resource management, quality of service enforcement, and session management, as well as other functions.

ASN gateway 307 provides a traffic aggregation point for base stations 305 and 306. Additional functions may include location management and paging, radio resource management and admission control, subscriber profile management, AAA functionality, and quality of service provisioning and management.

Service network 309 provides mobile station 301 with connectivity to IP network 319, and connectivity to PSTN 319. It should be understood that service network 309 could provide connectivity to other networks as well, such as a 3GPP/3GPP2 network, an intranet, LAN, WAN, public networks, corporate networks, or the like. Service network 309 may include elements such as AAA servers that provide authentication and authorization services to devices, such as mobile station 301. Service network 309 handles IP address management, roaming support, location management, and interworking of communications to formats suitable for other networks, such as PSTN 319.

It should be understood that any of the functions described as pertaining to base stations 305 and 306, ASN gateway 307, or service network 309 could reside in or be performed by any of those elements. In addition, the elements themselves could be combined or otherwise contained within each other. For example, ASN gateway could be contained in or combined with at least one of base stations 305 and 306.

Figure 4:
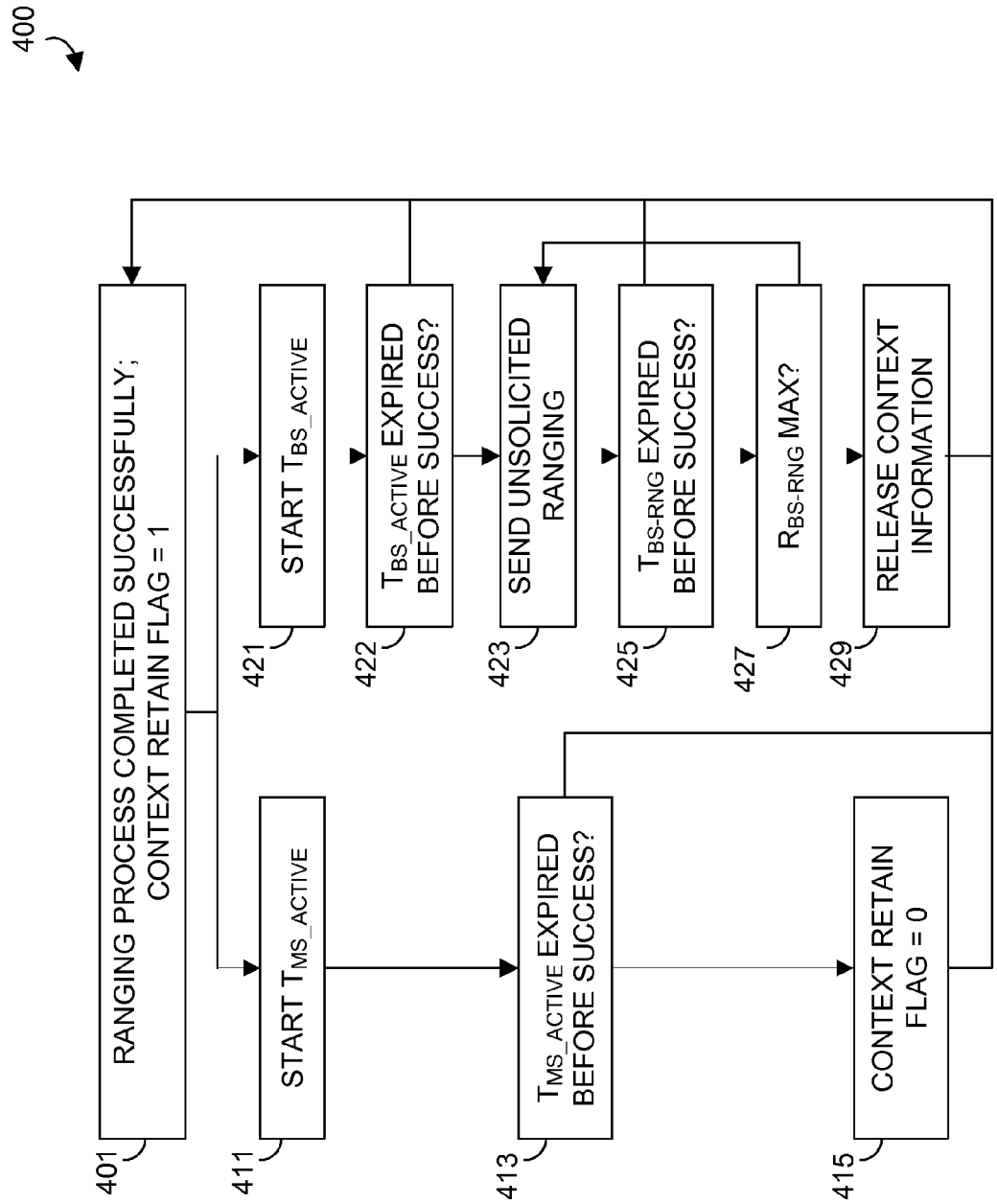
FIG. 4 illustrates the operation of the wireless communication system.

FIG. 4 illustrates process 400, which describes the operation of the timers and signaling over the air interface utilized by communication system 300 to provide improved synchronization. In particular, process 400 describes how mobile station 301 determines whether a full or partial entry process is required to re-enter the network in the event of experiencing a coverage hole utilizing a number of timers. The timers include $T_{BS\_ACTIVE}$ maintained by base station 305, along with $T_{BS-RNG}$, and a counter $R_{BS-RNG}$ MAX, which are all configurable and are negotiated during initial network entry. A timer $T_{MS\_ACTIVE}$ is maintained by mobile station 301. $T_{MS\_ACTIVE}$ is set based on the values of $T_{BS\_ACTIVE}$, $T_{BS-RNG}$, and $R_{BS-RNG}$ MAX. In one example, $T_{MS\_ACTIVE} = T_{BS\_ACTIVE} + [(T_{BS-RNG})(R_{BS-RNG}\ MAX)]$. It should be understood that $T_{MS\_ACTIVE}$ could be determine by other means.

Referring again to FIG. 4, mobile station 301 has established wireless connection 303 with base station system 305. Wireless connection 303 may be considered a layer 1, or physical layer link. Likewise, mobile station 301 has established a network connection with service network 309 by performing a full network entry process. The full network entry process may include steps such as scanning for downlink channels, synchronizing with the downlink of a serving base station, obtaining uplink parameters, ranging, negotiating basic capabilities, authorization and key exchange, network registration, obtaining an IP address, obtaining time of day, transferring operational parameters, and establishing provisioned parameters. It should be understood that some steps could be omitted and other, different steps included in a full network entry process.

Mobile station 301 is initially located in a geographic area and exchanges communications over the network connection. The network connection may be considered an upper layer link relative to layer 1 link wireless connection 303. For example, the network connection may be a layer 2 or layer 3 connection.

The communications are exchanged using context information that identifies the network connection. Examples of context information include internet protocol (IP) addresses, media access control (MAC) identifiers, and the like. Establishing the network connection can be referred to as "entering" a service network that provides mobile station 301 with access service. The access service allows mobile station 301 to communicate over service network 309 with destinations in PSTN 319 or IP network 329. For example, a user operating mobile station 301 may place phone calls, browse the worldwide web, check email, or otherwise utilize voice, video, media, or data services provided by service network 309.

Mobile station 301 communicates with base station 305 to continually attempt and execute ranging processes to maintain wireless link 303. Upon the completion of each successful ranging process, mobile station 301 sets the value of a context retain flag stored in memory to 1 (Step 401) and starts timer $T_{MS\_ACTIVE}$ (Step 421).

If $T_{MS\_ACTIVE}$ expires before the next successfully completed ranging process (Step 413), then mobile station 301 sets the value of the context retain flag to 0 (Step 415). If the next successful ranging process is completed before $T_{MS\_ACTIVE}$ expires, then mobile station 301 process 400 returns to Step 401 and the context retain flag remains set to 1.

At the same time, base station 305 starts timer $T_{BS\_ACTIVE}$ (Step 421) and monitors $T_{BS\_ACTIVE}$ to determine if the next successful ranging process is completed by its expiration (Step 422). If the next successful ranging process is completed before $T_{BS\_ACTIVE}$ expires, then base station 305 maintains the context information established by mobile station 301 and process 400 returns to Step 401. If $T_{BS\_ACTIVE}$ expires before the next successful ranging process is completed, then base station 305 transmits or sends an unsolicited ranging request to mobile station 301 (Step 423) and starts $T_{BS-RNG}$, which corresponds to an amount of time to wait between unsolicited ranging requests.

Base station 305 monitors $T_{BS-RNG}$ to determine if the next successful ranging process is completed before its expiration (Step 425). If the next successful ranging process is completed before $T_{BS-RNG}$ expires, then the context information is maintained, 400 returns to Step 401, and the context retain flag remains set to 1. If $T_{BS-RNG}$ expires before the next successful ranging process is completed, then base station 305 checks if a maximum number of unsolicited ranging requests—$R_{BS-RNG}$ MAX has been exceeded (Step 427).

If $R_{BS-RNG}$ MAX has not been exceeded, then process 400 returns to Step 423 and base station 305 transmits another unsolicited ranging request to mobile station 301. If $R_{BS-RNG}$ MAX has been exceeded, then base station 305 releases the context information used by mobile station 301 (Step 429).

Figure 5:
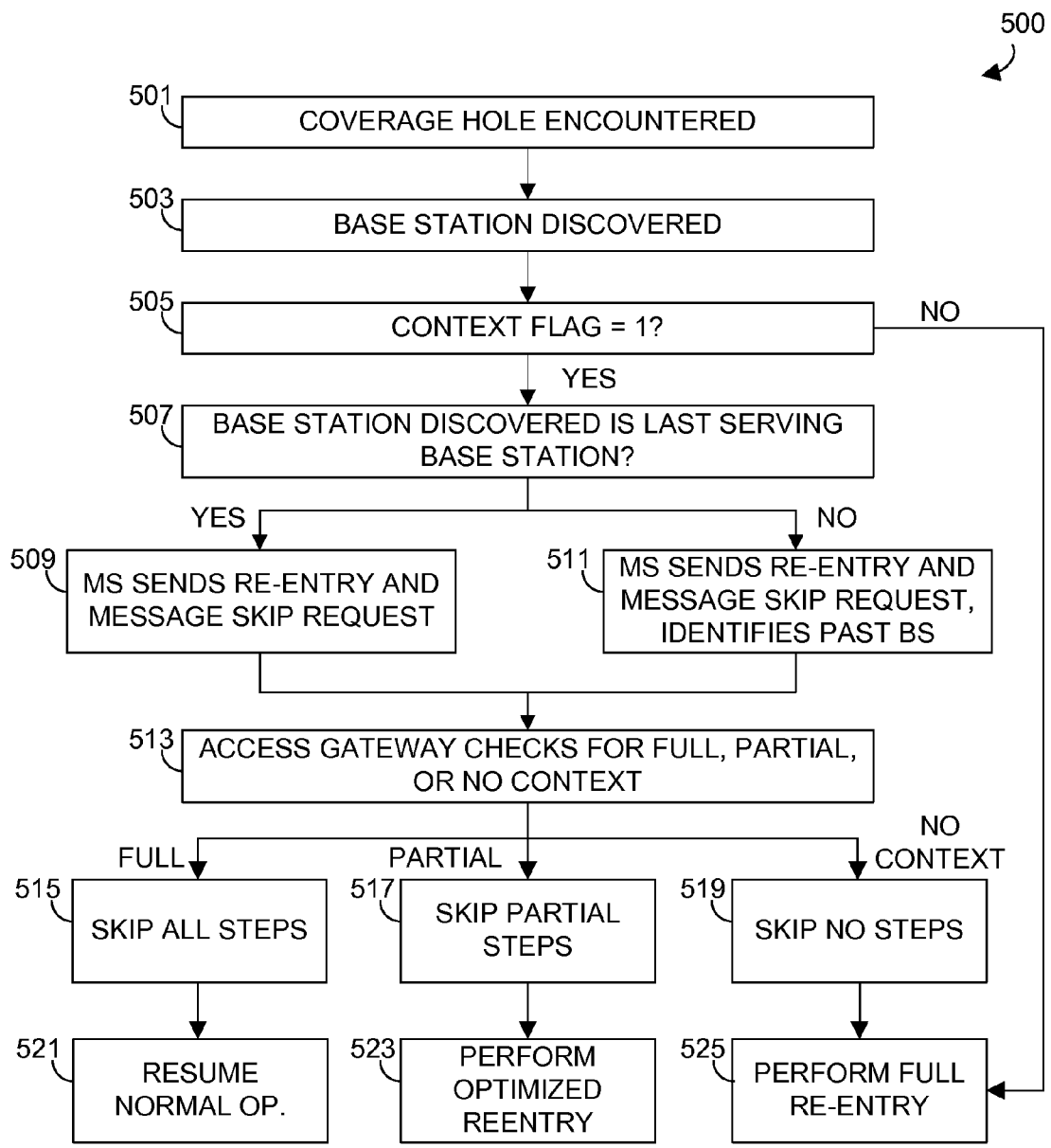
FIG. 5 illustrates the operation of the wireless communication system.

FIG. 5 illustrates process 500 describing the operation of communication system 300 as mobile station 301 first obtains coverage from base station 305, moves to a new location and experiences a coverage hole, and eventually leaves the coverage hold and re-establishes coverage. To begin, mobile station 301 moves to a new geographic location and encounters a coverage hole (Step 501). While in the coverage hole, wireless link 303 degrades and is dropped by mobile station 301, thereby inhibiting mobile station 301 from communicating with base station 305, and by extension, with communication network 309. The coverage hole could be caused by a variety of factors, such as physical obstructions between mobile station 301 and base station 305, as well as RF interference from other devices. Mobile station 301 may detect the coverage hole by lose of physical layer synchronization between itself and base station 305. For example, mobile station 301 may fail to receive a downlink preamble, downlink map, or valid uplink parameters.

Eventually, mobile station 301 leaves the coverage hole, or the coverage hole otherwise subsides, and discovers a base station (Step 503). Upon discovering the base station, mobile station 301 checks the state of a context flag stored in memory (Step 505). The state is set to either a 1 (one) or a zero (0) to indicate whether or not the context information originally obtained when wireless device established the initial network connection has been maintained while wireless device was in the coverage hole. A state of 1 indicates that the context information was maintained. A state of 0 indicates that the context information was not maintained. Mobile station 301 executes process 400 described above with respect to FIG. 4 to set the flag to either a 1 or 0.

If the context flag is set to 0, mobile station 301 performs a full network entry (Step 525) before commencing communications. If the context flag is set to 1, mobile station 301 determines if the recently discovered base station is the last serving base station—base station 305—or is otherwise a newly discovered base station—e.g. base station 306 (Step 507). The base station may be identified by a base station identifier included in a pilot signal transmitted by the base station. Other well known ways to identify the base station are possible.

If the recently discovered base station is base station 305, wireless device 301 sends a re-entry and message skip request requesting re-entry into the network, thereby regaining the network connection and allowing mobile station 301 to once again communicate with service network 309 (Step 509).

If the recently discovered base station is not base station 305, but rather is newly discovered base station 306, then mobile station 301 sends a re-entry and message skip request that identifies the last serving base station-base station 305 (Step 511). Mobile station 301 may identify the base station by a base station identifier (ID), or the like, included in the re-entry message. This allows the newly discovered base station to retrieve the context information from the last serving base station. The skip message indicates that mobile station 301 assumes the network has maintained some—if not all—of the context information and at least portions of a re-entry process may be skipped.

The serving base station—base station 305 or base station 306—receives the re-entry and skip request and checks if full, partial, or no context information was maintained while mobile station 301 was in the coverage hole (Step 513). The serving base station informs mobile station 301 which steps—if any—may be skipped relative to the full entry steps described above for the initial entry of mobile station 301 into the network. If full context information was maintained, then all re-entry steps can be skipped (Step 515)—meaning that all of the full entry steps are performed—and mobile station 301 resumes normal operations (Step 521). If only partial context information was maintained, then mobile station 301 skips some re-entry steps, or partial steps (Step 517)—meaning that less than the full network entry steps are performed—and performs an optimized re-entry process comprising the partial steps (Step 523). For example, the step of obtaining an IP address may be skipped. If no context information was maintained, then no steps are skipped (Step 519) and all of the full network entry steps are performed (Step 525).

The following are new TLVs for RNG-REQ and RNG-RSP messages defined in WiMAX standard IEEE 802.16e. When notifying the network that an entry is a re-entry, a mobile station should notify the network that this entry is a re-entry utilizing a Network Re-entry bit of the Ranging Purpose Indication TLV in RNG-REQ (existing TLV). This bit is bit #0 of Ranging Purpose Indication TLV, and is defined for handover scenario for active mobile stations in IEEE 802.16e and can be set to 1 to indicate network re-entry in coverage hole scenarios.

When notifying the network of its previous serving base station, a mobile station should notify the network of its previous serving BS before it had entered the coverage hole utilizing Serving BSID TLV in RNG-REQ (existing TLV). This is an existing TLV, and is defined for a handover scenario for active mobile stations in current IEEE 802.16e, which indicates the BS to which the MS is currently connected. For coverage hole scenarios, this can be extended to be the MS's last serving BS before entering into a coverage hole.

To request if one or more network entry steps could be omitted, a mobile station may utilized a Message Skip Request bit of the Ranging Purpose Indication TLV in RNG-REQ. This is defined to be bit #2 of the Ranging Purpose Indication TLV in RNG-REQ. This bit is set to be 1 when the MS comes back into coverage to ask for network entry steps that can be omitted.

The BS should notify the MS which network entry steps could be omitted utilizing a Message Skip Response TLV and HO Process Optimization TLV in RNG-RSP. This new TLV in RNG-RSP may be referred to as a Message Skip Response TLV. The value 0x00, 0x01 and 0x10 mean no, partial, and all messages after ranging can be omitted, respectively. When the Message Skip Response TLV is set to be 0x01, which means that the network has partial of the MS context, the HO Process Optimization TLV is included to indicate network re-entry process management messages that can be omitted.

In an example utilizing the above signaling mechanisms, when the MS comes back into coverage, the MS checks its Context Flag F. If F=0, the MS performs full network entry. If F=1, the MS and the network exchange key information through RNG-REQ/RSP messages. There are three outcomes: no, partial, or all network entry management messages that can be omitted after ranging. The MS and the network fully utilize available context information for completing network re-entry and resuming normal operation. Depending on the outcome of the previous two steps, the MS and the network conduct different operations as below: Full network entry when no messages can be omitted or when F=0; Optimized network re-entry when partial messages can be omitted; or resume normal operation when all messages can be omitted.

Setting the Context Flag F can be accomplished as follows. The MS keeps a flag F-active, referred to as the Context Retain Flag, which is set to be one (1) when the MS assumes that the network maintains its context, and zero otherwise. In addition, both the MS and the BS keep a timer, called Active State Timeout at the MS and the BS, and denoted by $T_{MS\_ACTIVE}$ and $T_{BS\_ACTIVE}$, respectively. Both timers are restarted upon the completion of each successful ranging process. Upon the expiration of $T_{BS\_ACTIVE}$ at the BS and successive failure attempts to regain connection from the BS side, the BS assumes that the MS is not connected and notifies the rest of the network to release its context information accordingly. Meanwhile, upon the expiration of $T_{MS\_ACTIVE}$ at the MS, the MS assumes that the network discards its context. The careful setting of the values of these two timers ensures that the network and the MS maintain synchronization on each other's state.

The value of $F_{ACTIVE}$ and $T_{MS\_ACTIVE}$ is a function of network operation and other parameters. The values of $T_{BS\_ACTIVE}$, $T_{BS-RNG}$ and $R_{BS-RNG}$MAX are configurable and negotiated during network initial entry procedure via REG-REQ and REG-RSP messages. For this purpose, the following new TLVs are defined for REG-REQ and REG-RSP messages:

| Type | Length (bytes) | Value | Scope |
|---|---|---|---|
| 50 | 1 | Unsigned integer representing Unsolicited Ranging Timeout in milliseconds | REG-REQ/RSP |
| 51 | 1 | Unsigned integer representing Unsolicited Ranging Retries | REG-REQ/RSP |
| 52 | 1 | Unsigned integer representing Active State Timeout at BS in seconds | REG-REQ/RSP |

For the timer $T_{BS\_ACTIVE}$, the value of the timeout $T_{BS\_ACTIVE}$ is negotiated during initial network entry procedure via REG-REQ and REG-RSP messages. The timer restarts each time upon a successful ranging completion. Upon $T_{BS\_ACTIVE}$ expiration at the BS, the BS sends unsolicited RNG-RSP to attempt to regain the connection. If the ranging completes successfully, $T_{BS\_ACTIVE}$ restarts. Otherwise, if the ranging fails after several attempts, the BS assumes that the MS has left the network and release MS's context accordingly.

For the timer TMS_active, the value of the timeout TMS_active is set to be $T_{BS\_ACTIVE}+T_{BS\_RNG}*R_{BS-RNG}$ during initial network entry procedure. The timer restarts each time upon a successful ranging completion. Upon the expiration of this timer at the MS, MS assumes that the network discards the MS context.

Generally, for Context Retain Flag $F_{ACTIVE}$, roughly speaking, if the duration the device stays in coverage hole is denoted by t, then $F_{ACTIVE}=1$ when $t<T_{MS\_ACTIVE}=T_{BS\_ACTIVE}+T_{BS\_RNG}*R_{BS-RNG}$. Otherwise, $F_{ACTIVE}=0$.

That is, generally the MS assumes that the network discards its context after the MS stays in the coverage hole for a long enough duration.

Figure 6:
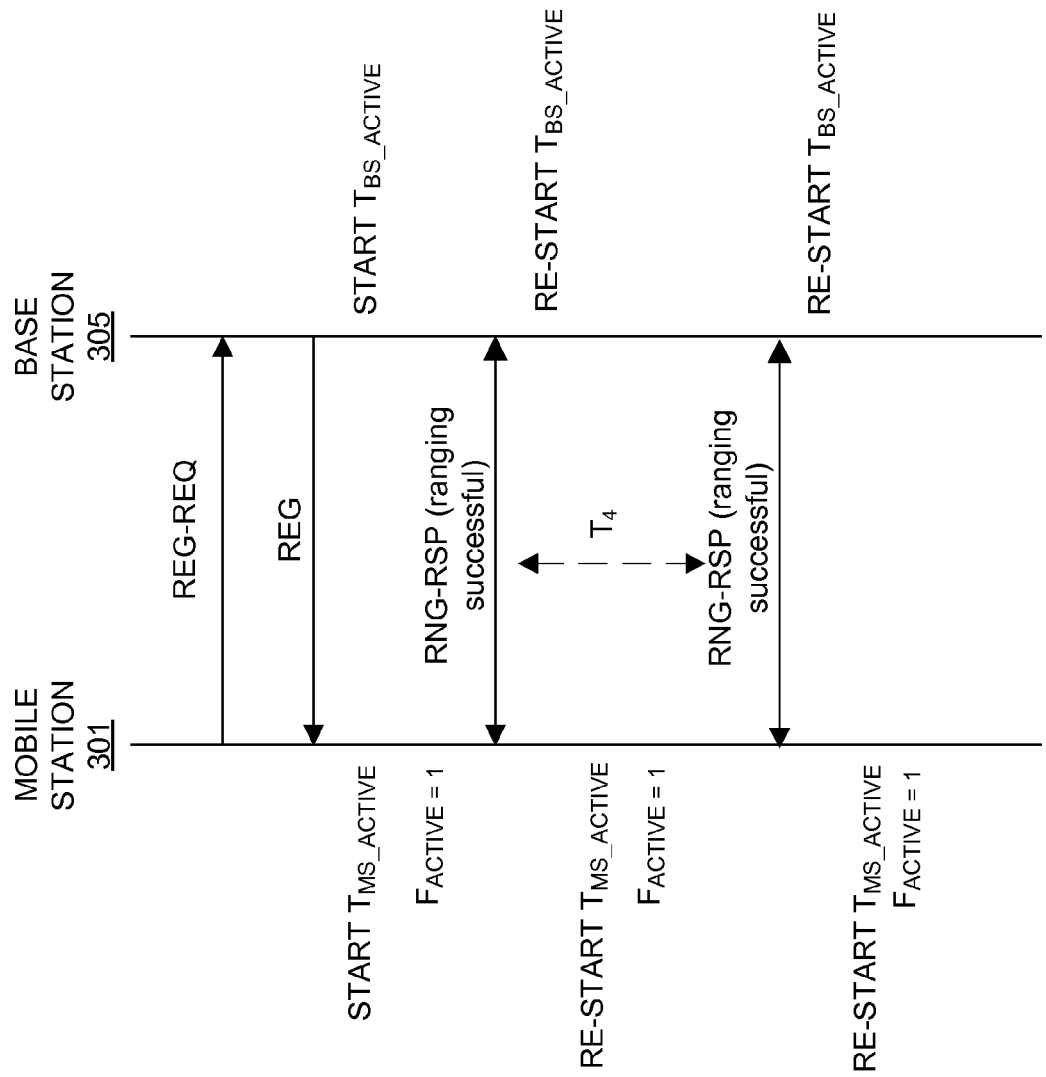
FIG. 6 illustrates an operational flow diagram.

FIG. 6 is an operational flow diagram further illustrating the operation of communication system 300. In FIG. 6, is an example is illustrated whereby mobile station 301 and base station 305 successfully complete ranging processes and retain context information.

As discussed above, mobile station 301 and base station 305 initially negotiate the values of $T_{BS\_ACTIVE}$ and $T_{BS-RNG}$. As shown, mobile station 301 exchanges a REG-REQ message with base station 305. Base station 305 responds with a REG message, acknowledging the request and indicating that a ranging process has been completed successfully.

In response to successfully completing the ranging process, mobile station starts r $T_{MS\_ACTIVE}$, which is set to equal $T_{BS\_ACTIVE}+[(T_{BS-RNG})(R_{BS-RNG}\ MAX)]$. Likewise, base station 305 starts $T_{BS\_ACTIVE}$.

As is shown for illustrative purposes, eventually another ranging processes is completed successfully, as indicated by RNG-RSP. It should be understood that a standard amount of time $T_4$ typically elapses between attempted ranging processes. At the expiration of $T_4$, assuming the last ranging processes was completed successfully, another ranging process is attempted.

In FIG. 6, this ranging process is also successful. In response to the successful ranging process, mobile station re-starts $T_{MS\_ACTIVE}$ and base station 305 re-starts $T_{BS\_ACTIVE}$. Moreover, mobile station 301 sets its context retain flag—$F_{ACTIVE}$, to 1, indicating that a partial network entry process would be required should network entry be necessary.

Figure 7:
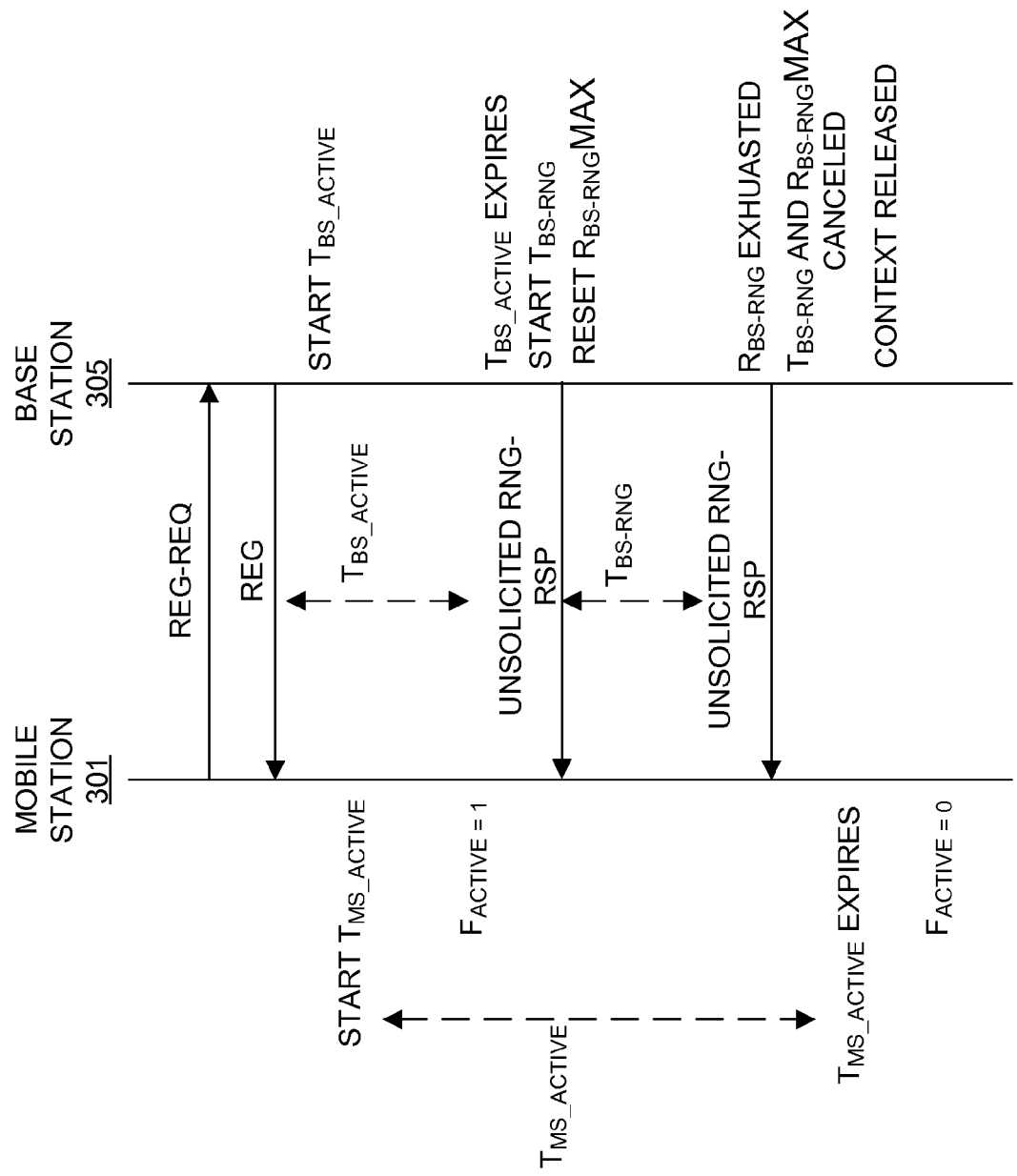
FIG. 7 illustrates an operational flow diagram.

FIG. 7 is another operational flow diagram further illustrating the operation of communication system 300. In FIG. 7, is an example is illustrated whereby mobile station 301 and base station 305 fail to successfully complete a ranging process, and thus fail to retain context information.

As discussed above, mobile station 301 and base station 305 initially negotiate the values of $T_{BS\_ACTIVE}$ and $T_{BS-RNG}$. As shown, mobile station 301 exchanges a REG-REQ message with base station 305. Base station 305 responds with a REG message, acknowledging the request and indicating that a ranging process has been completed successfully.

In response to successfully completing the ranging process, mobile station starts timer $T_{MS\_ACTIVE}$, which is set to equal $T_{BS\_ACTIVE}+[(T_{BS-RNG})(R_{BS-RNG}\ MAX)]$. Likewise, base station 305 starts $T_{BS\_ACTIVE}$.

At the expiration of $T_{BS\_ACTIVE}$, if another ranging process has not been completed, base station 305 transmits an unsolicited RNG-RSP to mobile station 301. Base station 305 also starts $T_{BS-RNG}$ and resets counter $R_{BS-RNG}$ MAX. At the expiration of each period measured by $T_{BS-RNG}$, base station 305 transmits another unsolicited RNG-RSP to mobile station 301 and increments counter $R_{BS-RNG}$ MAX.

Once $R_{BS-RNG}$ MAX has been exhausted, $T_{BS-RNG}$ and $R_{BS-RNG}$ MAX are both canceled. In addition, the context information used by mobile station 301 to communicate released. Base station 305 may notify other elements that the context information has been or should be released, such as ASN gateway 307 and service network 309. At the same time, $T_{MS\_ACTIVE}$ expires. In response, mobile station 301 sets $F_{ACTIVE}$ to zero, indicating to mobile station 301 that a full network entry process is required to re-enter the network upon exiting a coverage hole.

Figure 8:
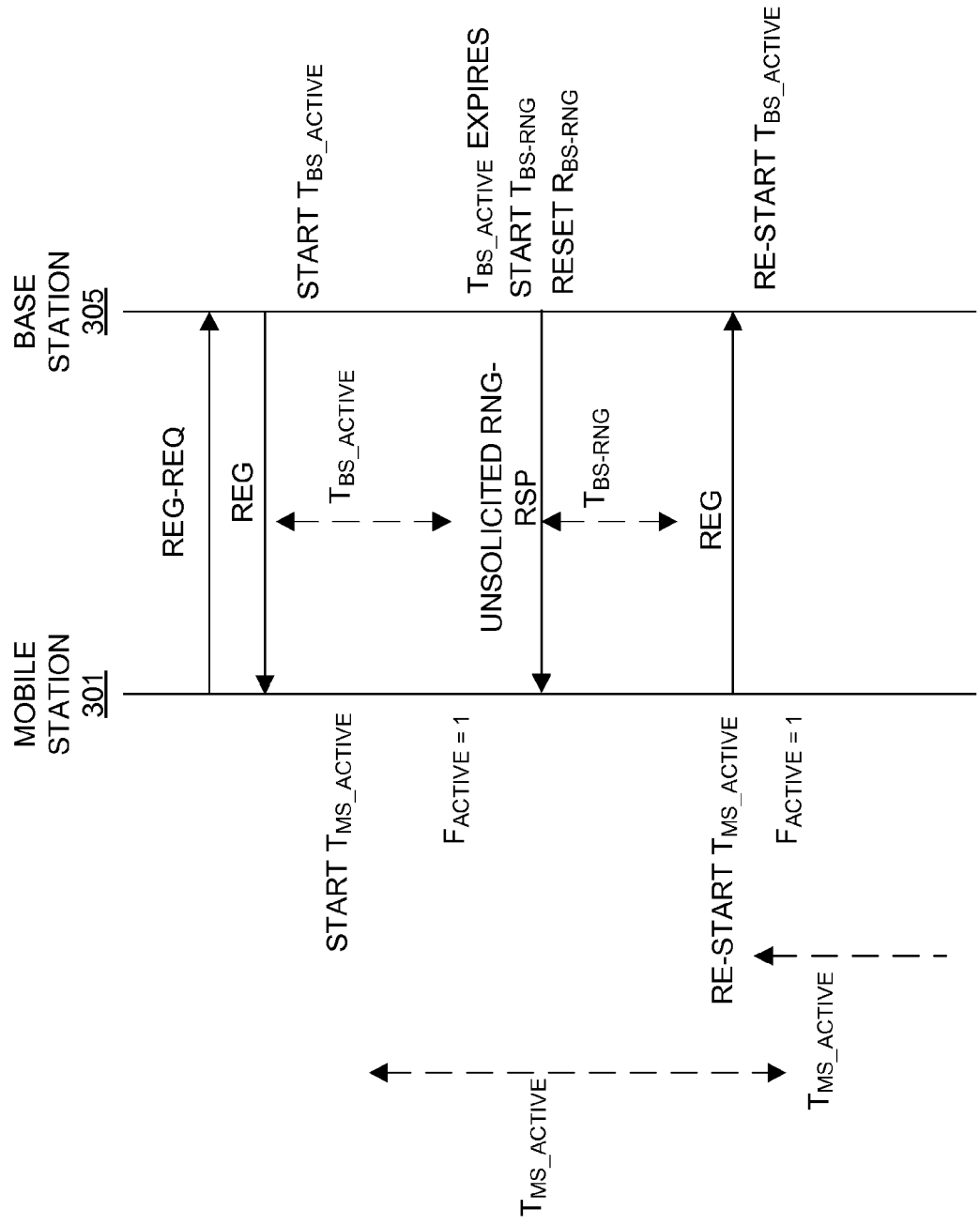
FIG. 8 illustrates an operational flow diagram.

FIG. 8 illustrates another operational flow diagram describing the operation of communication system 300. In FIG. 8, is an example is shown whereby mobile station 301 and base station 305 successfully complete a ranging process after entering a coverage hole.

As discussed above, mobile station 301 and base station 305 initially negotiate the values of $T_{BS\_ACTIVE}$ and $T_{BS-RNG}$. As shown, mobile station 301 exchanges a REG-REQ message with base station 305. Base station 305 responds with a REG message, acknowledging the request and indicating that a ranging process has been completed successfully.

In response to successfully completing the ranging process, mobile station starts timer $T_{MS\_ACTIVE}$, which is set to equal $T_{BS\_ACTIVE}+[(T_{BS-RNG})(R_{BS-RNG}\ MAX)]$. Likewise, base station 305 starts $T_{BS\_ACTIVE}$.

In this example, at the expiration of $T_{BS\_ACTIVE}$ another ranging process has not been completed, thus indicating that mobile station 301 entered a coverage hole. In response, base station 305 transmits an unsolicited RNG-RSP to mobile station 301. Base station 305 also starts $T_{BS-RNG}$ and resets counter $R_{BS-RNG}$ MAX. At the expiration of each period measured by $T_{BS-RNG}$, base station 305 transmits another unsolicited RNG-RSP to mobile station 301 and increments counter $R_{BS-RNG}$ MAX.

Further in this example, mobile station 301 successfully responds to an unsolicited RNG-RSP before the expiration of $T_{MS\_ACTIVE}$, and before $R_{BS-RNG}$ MAX is exhausted. In response to the successful ranging process, mobile station 301 maintains $F_{ACTIVE}$ set to 1, indicating that a partial network re-entry process would be required upon exiting the coverage hole. In addition, base station 305 re-starts $T_{BS\_ACTIVE}$.

FIG. 9 illustrates wireless communication device 900. Wireless communication device 900 is an example of wireless communication device 101, and mobile station 301, although device 101 and 301 could use alternative configurations. Wireless communication device 900 comprises wireless communication interface 901, user interface 902, and processing system 903. Processing system 903 is linked to wireless communication interface 901 and user interface 902. Processing system 903 includes processing circuitry and storage system 904 that stores software 905. Wireless communication device 900 may include other well-known components such as a battery and enclosure that are not shown for clarity. Wireless communication device 900 may be a mobile phone, computer, e-book, mobile Internet appliance, media player, game console, wireless network interface card, or some other wireless communication apparatus—including variations or combinations thereof.

Wireless communication interface 901 comprises at least an antenna and RF communication circuitry. The RF communication circuitry typically includes an amplifier, filter, RF modulator, and signal processing circuitry. Wireless communication interface 901 may also include a memory device, software, processing circuitry, or some other communication device. Wireless communication interface 901 may use various protocols, such as WIMAX, CDMA, CDMA2000, WCDMA EVDO, GSM, LTE, WIFI, HSPA, or some other wireless communication format to communicate wirelessly with base stations.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing system 903 may comprise a microprocessor and other circuitry that retrieves and executes software 905 from storage system 904. Storage system 904 comprises a disk drive, flash drive, data storage circuitry, or some other memory apparatus. Processing system 903 is typically mounted on a circuit board that may also hold storage system 904 and portions of communication interface 901 and user interface 902. Software 905 comprises computer programs, firmware, or some other form of machine-readable processing instructions. Software 905 may include an operating system, utilities, drivers, network interfaces, applications, or some other type of software. When executed by processing system 903, software 905 directs processing system 903 to operate wireless communication device 900 as described herein for wireless device 101 and 303.

In particular, software 905, when executed by processing system 903, directs processing system 903 to perform a network entry process to establish a network connection between wireless device 900 and a communication network. Wireless communication interface 901 exchanges initial communications with a network access system or base station and the communication network over a wireless connection and the network connection established with the communication network.

In response to a loss of the network connection due to a deterioration of the wireless connection, software 905, when executed by processing system 903, directs processing system 903 to determine if a full network entry process is required to regain the network connection or if a partial network entry process is required to regain the connection. If the full network entry process is required to regain the network connection, processing system 903 performs the full network entry process. If the partial network entry process is required to regain the network connection, processing system 903 performs the partial network entry process. I In response to an improvement of the wireless connection and upon regaining the network connection, wireless communication interface 901 exchanges new communications with the communication network over the wireless connection and the network connection.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   exchanging initial communications between a wireless communication device and a communication network over a wireless connection;
   establishing a network connection between the wireless communication device and the communication network by performing a network entry process;
   performing a first ranging process to monitor a status of the wireless connection;
   initiating a timer at the wireless communication device each time a successful first ranging process occurs;
   setting an indicator in the memory of the wireless communication device indicative of a type of entry process used to regain the network connection when the wireless connection deteriorates,
   wherein a partial entry process regains network connection when a successful first ranging process occurs before the wireless communication device timer expires.

2. The method of claim 1 further comprising, setting an indicator to indicate that a full entry process is required to regain the network connection upon an unsuccessful attempt to regain the wireless connection.

3. The method of claim 2 further comprising, processing the indicator to determine if the full network entry process or the partial network entry process is required to regain the network connection and performing either the full network entry process or the partial network entry process.

4. The method of claim 1 wherein an unsuccessful attempt to regain the wireless connection occurs due to a coverage hole encountered by the wireless communication device.

5. The method of claim 1 wherein the wireless connection comprises a layer one connection and wherein the network connection comprises a layer two connection.

6. The method of claim 1 wherein exchanging the initial communications comprises exchanging the initial communications in accordance with a wireless communication protocol.

7. The method of claim 6 wherein the wireless communication protocol comprises Worldwide Inter-operability for Microwave Access (WiMAX).

8. The method of claim 6 wherein the wireless communication protocol comprises Long Term Evolution (LTE).

9. A communication system comprising:
   a communication network;
   a network access system coupled to the communication network and configured to provide access to the communication network;
   a wireless communication device in communication with the network access system and configured to:
       exchange initial communications with the communication network over a wireless connection between the wireless communication device and the network access system and a network connection between the wireless communication device and the communication network;
       perform a plurality of ranging processes to monitor a status of the wireless connection;
       initiate a timer when a successful ranging process occurs, the timer comprising a timeout threshold;
       attempt to regain the wireless connection by initiating a ranging process at the network access system when an unsuccessful ranging process occurs and the timer exceeds the timeout threshold;
       set an indicator to indicate that a partial entry process is required to regain the network connection upon a successful attempt to regain the wireless connection; and
       process the indicator to determine if the partial network entry process is required to regain the network connection through a second wireless connection between the wireless communication device and the network access system.

10. The communication network of claim 9 wherein, the wireless communication device is configured to set an indicator to indicate that a full entry process is required to regain the network connection upon an unsuccessful attempt to regain the wireless connection.

11. The communication system of claim 10 wherein, the wireless communication device is configured to process the indicator to determine if the full network entry process or the partial network entry process is required to regain the network connection and perform either the full network entry process or the partial network entry process.

12. The communication system of claim 9 wherein an unsuccessful attempt to regain the wireless connection occurs due to a coverage hole encountered by the wireless communication device.

13. The communication system of claim 9 wherein the wireless connection comprises a layer one connection and wherein the network connection comprises a layer two connection.

14. The communication system of claim 9 wherein exchanging the initial communications comprises exchanging the initial communications in accordance with a wireless communication protocol.

15. The communication system of claim 14 wherein the wireless communication protocol comprises Worldwide Inter-operability for Microwave Access (WiMAX).

16. The communication system of claim 14 wherein the wireless communication protocol comprises Long Term Evolution (LTE).

17. A wireless communication device comprising:
   a communication interface configured to exchange initial communications with a communication network over a wireless connection between the communication interface and a network access system and a network connection between the communication interface and the communication network; and
   a processing system coupled to the communication interface and configured to:
      perform a plurality of ranging processes to monitor a status of the wireless connection;
      upon completing each ranging process of the plurality of ranging processes, initiate a timer when a successful ranging process occurs, the timer comprising a timeout threshold;
      attempt to regain the wireless connection by initiating a ranging process at the network access system when an unsuccessful ranging process occurs and the timer exceeds the timeout threshold;
      set an indicator to indicate that a partial entry process is required to regain the network connection upon a successful attempt to regain the wireless connection; and
      process the indicator to determine if the partial network entry process is required to regain the network connection through a second wireless connection between the wireless communication device and the network access system.

* * * * *